US010299236B2

(12) United States Patent
Das et al.

(10) Patent No.: US 10,299,236 B2
(45) Date of Patent: May 21, 2019

(54) GROUP ALARMS

(71) Applicant: eBay Inc., San Jose, CA (US)

(72) Inventors: Ananya Das, Austin, TX (US); Jason Ziaja, Cedar Park, TX (US); Bryant Genepang Luk, Round Rock, TX (US); Christopher Diebold O'Toole, Cedar Park, TX (US); Robert He, Pflugerville, TX (US); Yu Tang, Round Rock, TX (US); Jennifer T. Brenner, Austin, TX (US)

(73) Assignee: EBAY INC., San Jose, CA (US)

( * ) Notice: Subject to any disclaimer, the term of this patent is extended or adjusted under 35 U.S.C. 154(b) by 23 days.

(21) Appl. No.: 15/042,574

(22) Filed: Feb. 12, 2016

(65) Prior Publication Data

US 2017/0237631 A1 Aug. 17, 2017

(51) Int. Cl.
*H04L 12/24* (2006.01)
*H04W 56/00* (2009.01)
*H04W 4/06* (2009.01)
*H04W 8/18* (2009.01)

(52) U.S. Cl.
CPC .......... *H04W 56/002* (2013.01); *H04W 4/06* (2013.01); *H04W 8/183* (2013.01)

(58) Field of Classification Search
CPC .......... H04W 4/22; H04W 4/02; H04W 8/18; G08B 27/006
See application file for complete search history.

(56) References Cited

U.S. PATENT DOCUMENTS

| | | | |
|---|---|---|---|
| 6,928,031 B1 | 8/2005 | Kanevsky et al. | |
| 8,150,429 B1* | 4/2012 | Zheng | H04W 4/21 455/466 |
| 8,478,242 B2 | 7/2013 | Mathew et al. | |
| 2010/0177598 A1 | 7/2010 | Zhang et al. | |
| 2010/0317392 A1* | 12/2010 | Davis | H04W 4/02 455/518 |

(Continued)

FOREIGN PATENT DOCUMENTS

| | | |
|---|---|---|
| CN | 103974204 A | 8/2014 |
| WO | 2013/123885 A1 | 8/2013 |

OTHER PUBLICATIONS

Matthews, "5 Social Alarm Apps to Help You Get out of Bed", Retrieved from the Internet URL: <http://www.makeuseof.com/tag/5-social-alarm-apps-help-get-bed/>, May 6, 2015, 8 pgs.

*Primary Examiner* — Asad M Nawaz
*Assistant Examiner* — Syed Ali
(74) *Attorney, Agent, or Firm* — Maschoff Brennan (57) ABSTRACT

A method of configuring alarm settings of a group of mobile devices is disclosed. The method may include receiving a proposed alarm from a mobile device of the group of mobile devices, the proposed alarm associated with settings, including a proposed time. The method may further include receiving votes from the group of mobile devices, each of the votes associated with an approval or a disapproval of the settings associated with the alarm. The method may further include receiving a number of approval votes associated with a threshold portion of the group of mobile devices, the approval votes indicating approval of configuring each of the mobile devices of the group of mobile devices to perform an alarm action at an alarm time associated with the proposed time.

17 Claims, 3 Drawing Sheets

(56) References Cited

U.S. PATENT DOCUMENTS

| | | | |
|---|---|---|---|
| 2012/0233694 A1* | 9/2012 | Baliga | G06F 21/568 726/23 |
| 2015/0111552 A1* | 4/2015 | Kaye | H04W 4/80 455/416 |
| 2015/0230072 A1* | 8/2015 | Saigh | H04W 4/22 455/404.1 |
| 2016/0173359 A1* | 6/2016 | Brenner | G06F 19/00 600/301 |
| 2016/0179498 A1* | 6/2016 | Das | G06F 8/65 717/171 |
| 2016/0182801 A1* | 6/2016 | Luk | H04N 5/23206 348/207.11 |
| 2016/0182816 A1* | 6/2016 | Luk | H04N 5/23219 348/222.1 |

* cited by examiner

GROUP ALARMS

BACKGROUND

Field

Embodiments described herein may relate to group alarms.

Relevant Technology

This information is only provided to illustrate an example where some aspects of the subject matter may be utilized. This application is not limited to solving any disadvantages or that operate only in environments such as those described above.

Mobile devices such as mobile phones, smart watches, and the like may allow users of the mobile devices to set an alarm to alert the user at a selected time. At the selected time, the mobile device may attempt to alert the user via audible, visual, and/or haptic output. Users are generally given an option to "snooze" the alert, which temporarily suspends the alert for a predetermined amount of time, such as five minutes or the like.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Embodiments may include a method of configuring alarm settings of a group of mobile devices. The method may include receiving a proposed alarm from a mobile device of the group of mobile devices, the proposed alarm associated with settings, including a proposed time. Votes may be received from the group of mobile devices, each of the votes associated with an approval or a disapproval of the settings associated with the alarm. The method may further include receiving a number of approval votes associated with a threshold portion of the group of mobile devices, the approval votes indicating approval of configuring each of the mobile devices of the group of mobile devices to perform an alarm action at an alarm time associated with the proposed time.

Additional embodiments may include a method of configuring alarm settings of a mobile device of a group of mobile devices. The method may include receiving a proposed alarm associated with settings, including a proposed alarm time. A representation of the settings associated with the proposed alarm may be displayed. A vote may be received from a user of the mobile device, the vote associated with an approval or a disapproval of the settings associated with the proposed alarm. The vote, indicating approval or disapproval of the settings associated with the alarm may be communicated. In response to a threshold portion of the group of mobile devices indicating approval of the proposed alarm, the mobile device may be configured, based at least in part on the settings of the proposed alarm, to perform an alarm action at an alarm time associated with the proposed alarm time. The alarm action may be performed at the alarm time.

Some additional embodiments may include a mobile device including a display, a processor, and a non-transitory computer storage medium having computer instructions stored thereon that are executable by the processor to perform operations, including receiving a proposed alarm associated with settings, including a proposed alarm time. A representation of the settings associated with the proposed alarm may be displayed on the display, A vote may be received from a user of the mobile device, the vote associated with an approval or a disapproval of the settings associated with the proposed alarm. The vote, indicating approval or disapproval of the settings associated with the alarm, may be communicated. In response to a threshold portion of the group of mobile devices indicating approval of the proposed alarm, the mobile device may be configured to perform an alarm action at an alarm time associated with the proposed alarm time. The mobile device may further perform the alarm action the alarm time.

Additional features and advantages of the subject matter will be set forth in the description that follows, and in part will be obvious from the description, or may be learned by the practice of the embodiments. The features and advantages of the embodiments may be realized and obtained by means of the instruments and combinations particularly pointed out in the appended claims.

BRIEF DESCRIPTION OF THE DRAWINGS

The subject matter will be described and explained with additional specificity and detail through the use of the accompanying drawings in which.

DETAILED DESCRIPTION

Situations may arise where a group of users may each wish to be alerted near or at a time relevant to the entire group. For example, the group may intend to collectively participate (in-person or virtually) in some event, such as sharing a meal; sharing transportation; exercising; participating in a sport or a game; attending a concert, movie, sporting event, and/or other entertainment event; participating in a teleconference or other meeting; or the like. Some conventional systems may allow members of a group to collectively accept an invitation to an event and to receive an alert at and/or before the event time. Alternatively, conventional systems may allow for sharing of basic alarm settings, such as an alert time, among a group.

However, when conventional systems are used, and/or when configuring an associated alarm is left to the individual members of the group, human nature may lead group members to forget to set an alarm, to configure the alarm such that it fails to alert the user (e.g., if the user sets the alarm on a mobile device placed in a silent state, such as a so-called "silent mode," which may be insufficient to rouse the user from sleep), to employ a snooze feature to delay the alarm, to silence or otherwise end the alarm without responding to the alarm, or the like. Thus, for example, members of the group may be late to the group event, miss the event entirely, cause the group to reschedule the event, and/or the like. An absent or tardy member of the group may inconvenience the other members of the group if the member fails to set an alarm or otherwise fails to respond to the alarm. Furthermore, if the absent member's mobile phone is in silent mode or the like, efforts to contact the absent member may also fail to rouse or otherwise alert the absent member.

In some embodiments, multiple users may form a group and may collectively set an alarm to be shared by the group. Alarm actions associated with the alarm may occur at mobile devices of the individual users of the group. Alarm settings, such as a date, a time, the alarm actions, a silent state override, a snooze disabler, and the like may be proposed to the group and may be approved or rejected by the group. In some embodiments, the alarm settings may be approved and applied to each mobile device of the group following a majority of the users voting to approve the alarm. Voting to approve the alarm settings may include an active act, such as indicating acceptance of the alarm settings.

In some embodiments, the individual members of the group may be prevented from changing or otherwise overriding one or more of the alarm settings. For example, individual members may be prevented from disabling the approved alarm, snoozing or otherwise delaying the approved alarm, changing an approved audible alarm to a silent or vibration-based alarm, changing a volume level of an approved audible alarm, or the like or any combination thereof. Alternately or additionally, the mobile devices of the individual members may be instructed to override a silent state of the mobile device. For example, the mobile device may be instructed to ring audibly, even if the mobile device has been placed in a silent state by the user, when another member of the group calls, sends a short message service (SMS) message, sends a multimedia messaging service (MMS) message, and/or otherwise attempts to communicate with the mobile device within a particular time period. Thus, for example, the mobile devices of the individual members of the group may be made to operate in a non-routine and/or unexpected manner.

Figure 1:
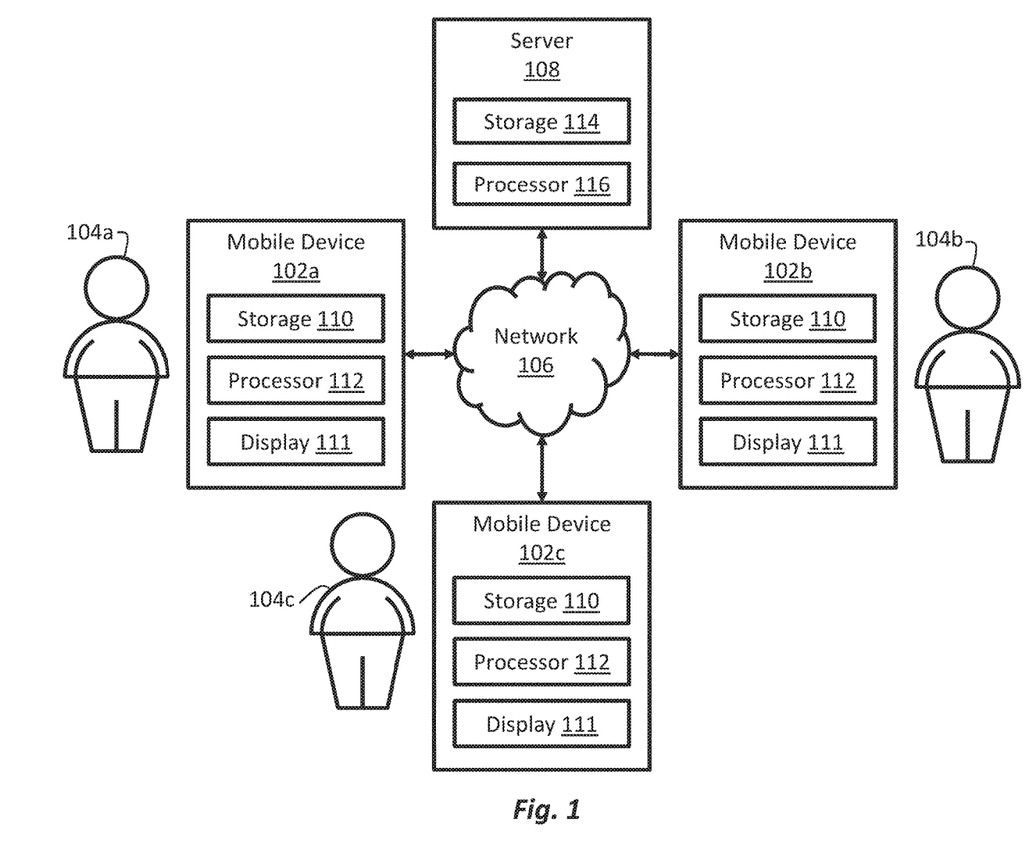
FIG. 1 illustrates an example group alarm system.

FIG. 1 is a diagram of an example system 100 in which some embodiments may be practiced. The system 100 may include a mobile device 102a, a mobile device 102b, and/or a mobile device 102c (collectively "mobile devices 102"). The mobile device 102a may be associated with a user 104a, the mobile device 102b may be associated with a user 104b, and the mobile device 102c may be associated with a user 104c (collectively "users 104"). The mobile devices 102 may generally include devices capable of generating an alarm action and communicating via a network 106. For example, the mobile devices 102 may include mobile terminals such as mobile phones, wearable devices such as so-called smartwatches and/or fitness trackers, network-connected alarm clocks, tablet computers, or the like or any combination thereof.

Each of the mobile devices 102 may include an associated processor 112 and a storage medium 110, such as a non-transitory computer-readable storage medium. The mobile devices 102 may also include systems and devices capable of performing alarm actions. For example, each of the mobile devices 102 may include an associated display 111, speakers, vibration-producing motors, or the like or any combination thereof.

Alarm actions may include actions designed to draw a user's attention and may include actions designed to rouse a user from sleep. For example, alarm actions may include producing a sound or sounds, such as music, repeating patterns of tones, noise, or the like or any combination thereof. Alternately or additionally, alarm actions may include producing tactile sensations, such as vibration, an electric current, pressure, or the like or any combination thereof. Alternately or additionally, alarm actions may include producing visual sensations, such as suddenly or gradually intensifying light, flashing light, or the like or any combination thereof.

Optionally, the system 100 may include a server 108. The mobile devices 102 and/or the server 108 may communicate via the network 106. The network 106 may include a radio access network, the Internet, a local area network, or the like or any combination thereof. The server 108 may include a processor 116 and a storage medium 114, such as a non-transitory computer-readable storage medium.

Instructions such as programming code executable by the processor 112 and/or the processor 116 may be encoded in the storage medium 110 and/or the storage medium 114. When the instructions are executed by the processor 112 and/or the processor 116, the associated mobile devices 102 and/or the server 108 may perform operations related to and/or including the processes described herein. In some embodiments, the mobile devices 102 and/or the server 108 may perform operations similar to those described with respect to method 200 of FIG. 2 and method 300 of FIG. 3. The methods 200 and 300 are described below in more detail.

In some embodiments, the mobile devices 102 may download and install an application for facilitating the processes and methods described herein. Optionally, applications installed on the mobile devices 102 may further communicate with a counterpart application installed on the server 108. Alternately or additionally, the applications installed on the mobile devices 102 may facilitate coordination directly between the mobile devices 102 to perform the processes and methods described herein.

The mobile devices 102 may be associated as belonging to an alarm group. In some embodiments, the alarm group may be created by one of users 104 associated with one of the mobile devices 102. Alternately or additionally, the users 104 associated with the mobile devices 102 may be invited to join the alarm group. Alternately or additionally, a password or other authentication may be requested from the mobile devices 102 and/or the users 104 attempting to join the alarm group. Alternately or additionally, a group administrator may maintain memberships of the alarm group, including associating and/or disassociating the mobile devices 102, and by extension, the users 104, with the alarm group. In some embodiments, alarm groups may be public and may be joined and/or left without significant restrictions.

Alarm groups may be associated with users 104 who wish to collectively share an alarm. For example, the users 104 belonging to the alarm group may all be planning to meet, participate collectively in an event, and/or otherwise perform some activity at or near a particular time. By way of example, a group of users may plan to meet in the early morning for a fishing trip, to carpool to and/or from a location, to meet at an event at a specified time, to meet for a meal and/or drinks, to collectively log in on a network system to play a computer game or to perform a fantasy sports draft, or the like. Thus, for example, each of the mobile devices 102 of the alarm group may be set to perform alarm actions associated with a shared alarm.

Each of the users 104 may be subject to a proposed alarm agreed upon by a majority of the group of users 104, regardless of whether the individual user affirmatively voted for the proposed alarm, affirmatively voted against the proposed alarm, or failed to affirmatively vote on the proposed alarm. Thus, for example, a majority of the group of users 104 may effectively set an alarm, with its associated settings, on all of the mobile devices 102. Setting the alarm for all of the mobile devices 102 may assist the users 104 to plan an event for the users 104 with relative confidence that the users 104 are unlikely to be absent or tardy as a result of individual users 104 forgetting to set, improperly setting, and/or subsequently disabling an alarm. In some embodiments, requesting a vote by the users 104 before enacting alarm settings on an absent user's mobile device may discourage abuse (such as scheduling unwelcome alarms or unwelcome alarm settings) of the alarm-setting rights given by the users 104.

In some embodiments, the shared alarm may be associated with settings of the mobile devices 102. In some embodiments, the mobile device settings may include a silent state override. For example, while the alarm action is occurring, the mobile devices' silent mode settings may be ignored and the mobile devices may produce an audible alarm even when the mobile devices 102 are otherwise set to silent. Alternately or additionally, the alarm may be associated with a volume level and the mobile phones' volume settings may be ignored. Alternately or additionally, the mobile device settings may include a snooze disabler. For example, the mobile devices 102 may limit or disable options for the users 104 to snooze or otherwise temporarily suspend the alarm action. Alternately or additionally, the mobile device settings may monitor sensors for some indication that the user is awake or otherwise responding to the alarm action before ceasing the alarm action. For example, the mobile devices 102 may monitor Global Positioning System (GPS) sensors, accelerometer sensors, gyrometer sensors, light level sensors, magnetometer sensors, microphones, changes in wireless signal strength, or the like or any combination thereof to detect whether the users 104 associated with the mobile devices 102 are moving, have moved, or have otherwise responded after receiving the alarm action before the mobile device ceases the alarm action. Alternately or additionally, the mobile devices 102 may monitor other devices that may indicate whether the users 104 are responding to the alarm action, such as network-connected lights, network-connected entertainment devices such as televisions and sound systems, network-connected motion sensors, network-connected thermostats, and/or the like.

Alternately or additionally, the mobile devices 102 may request some combination of inputs from the associated users 104 before ceasing the alarm action. For example, the mobile devices 102 may prompt the users 104 to compose and send a message to the group or perform some other task indicating that the users 104 are awake and responding to the alarm action. In some embodiments, the alarm action may be temporarily halted while the associated user is actively performing the requested input, the alarm action potentially resuming if the user fails to fully complete the requested input.

In some embodiments, each of the users 104 may be allowed some flexibility to alter their alarm settings. The degree of flexibility allowed may be defined as an alarm setting and may be subject to the vote from the group. For example, the alarm settings may permit the users 104 to adjust the alarm time such that the alarm action occurs up to an hour before or up to ten minutes after the proposed alarm time. Thus, for example, the proposed alarm may allow for the users 104 to fine-tune the alarm time to accommodate their preference or to reflect their situation. By way of example, a user who typically takes relatively more time to get ready and/or expects to spend relatively more time traveling to meet the group may be permitted, if allowed by the alarm settings, to adjust an individual alarm time to an earlier time. By way of further example, a user who typically takes relatively less time to get ready and/or expects to spend relatively less time traveling to meet the group may be permitted, if allowed by the alarm settings, to adjust an individual alarm time to a later time.

In some embodiments, the mobile devices 102 may report to the other mobile devices states of the mobile devices and/or the users 104 relevant to the alarm and/or alarm actions. In some embodiments, the users 104 may set and additional alarm or may alter settings of an active alarm for a particular user in response to the user failing to meet the other users at an agreed upon time, or the like. For example, if an absent user's mobile device reports to a group of assembled users that the absent user has been snoozing the alarm actions, the assembled users may vote to disable the snooze function on the active alarm. Alternately, if the absent user's mobile device reports that the alarm was turned off, the assembled users may vote to set a new alarm for the absent user.

Figure 2:
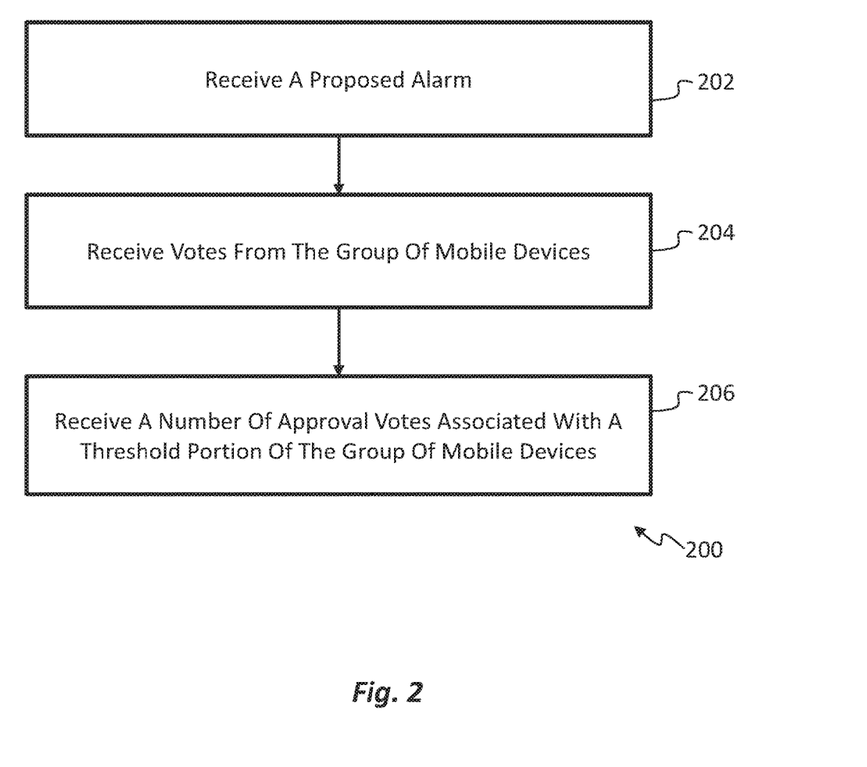
FIG. 2 illustrates an example group alarm method.

FIG. 2 illustrates an example group alarm method 200. The method 200 may configure alarm settings of a group of mobile devices, such as the mobile devices 102 of FIG. 1. The method 200 may be performed, for example, by one or more of the mobile devices 102 and/or the server 108 of FIG. 1. Although illustrated as discrete blocks, various blocks may be divided into additional blocks, combined into fewer blocks, or eliminated, depending on the desired implementation.

The method 200 may begin at block 202 by receiving a proposed alarm. The proposed alarm may be received from a mobile device of the group of mobile devices. Alternately, the proposed alarm may be received from a user of a mobile device, or the like. The proposed alarm may be associated with settings, including a proposed time. Alternately or additionally, the settings of the proposed alarm may be associated with one or more mobile device settings. The mobile device setting may alter an ordinary state of the mobile device. In some embodiments, the ordinary state of the mobile device may be altered such that the user of the mobile device is prevented from operating the mobile device in a manner that would otherwise be available to the user. For example, the mobile device settings may include an override of a setting and/or or a disabling of an option otherwise available to a user of the mobile device.

In some embodiments, the mobile device settings may include a silent state override configured to enable the mobile device to generate an audible alert when the mobile device has been placed in a silent state. The silent state override may be further configured to enable the mobile device to selectively generate the audible alert in response to being contacted by another mobile device of the group of mobile devices. Thus, for example, the silent state may be overridden for only the other users of the group while still applying to any contact attempts by devices not associated with the group. Alternately or additionally, the silent state override may be configured to override the silent state of the mobile device for a period of time following the proposed time. Thus, for example, the silent state may be overridden for a period of time relevant to the reason the group alarm was set, such that the user may be roused or otherwise reached if absent or tardy for some event, but may not be bothered by the silent state override after the event has taken place.

In some embodiments, the mobile device settings may include a snooze disabler. The mobile device may be configured to hide, disable, or otherwise ignore activation of a snooze request that may otherwise be available to the user of the mobile device. Thus, for example, the user of the mobile device may be discouraged from delaying an alarm action of the proposed alarm.

The method 200 may continue at block 204 by receiving votes from the group of mobile devices. Each of the votes may be associated with an approval or a disapproval of the settings associated with the alarm.

The method 200 may continue at block 206 by receiving a number of approval votes associated with a threshold portion of the group of mobile devices. The approval votes may indicate approval of configuring each of the mobile devices of the group of mobile devices to perform an alarm action. In some embodiments, the threshold portion of the group of mobile devices may be associated with a majority of the group of mobile devices. Alternately, the threshold portion may be based on a threshold portion of the votes received, which may be fewer than the number of mobile devices in the group. Alternately, some other threshold portion may be used, such as a two-thirds supermajority or some other supermajority. Alternately, the threshold portion may be less than a majority. For example, if the proposed alarm is one of multiple options, the threshold portion may be a plurality of the votes cast.

The alarm action may be performed at an alarm time associated with the proposed time. The alarm time may be equal to the proposed time. The settings associated with the proposed alarm may include a flexibility setting associated with a range of times including the proposed time within which a user may adjust the alarm time. Thus, for example, the alarm time may be different from the proposed time.

For this and other processes and methods disclosed herein, the functions performed in the processes and methods may be implemented in differing order. Furthermore, the outlined steps and operations are only provided as examples, and some of the steps and operations may be optional, combined into fewer steps and operations, or expanded into additional steps and operations without detracting from the essence of the disclosed embodiments.

In some embodiments, the method 200 may further include, receiving a second proposed alarm associated with second settings including a second time. Thus, for example, if a member of the group appears unroused or otherwise not alerted by the first alarm action, a second alarm may be proposed, accepted and/or executed in an attempt to rouse or otherwise alert the relevant user.

Alternately or additionally, the method 200 may include transmitting the proposed alarm to each mobile device of the group of mobile devices. Alternately or additionally, the method 200 may include transmitting an approval indication configured to instruct each of the mobile devices to perform an alarm action at alarm time associated with the proposed time.

Figure 3:
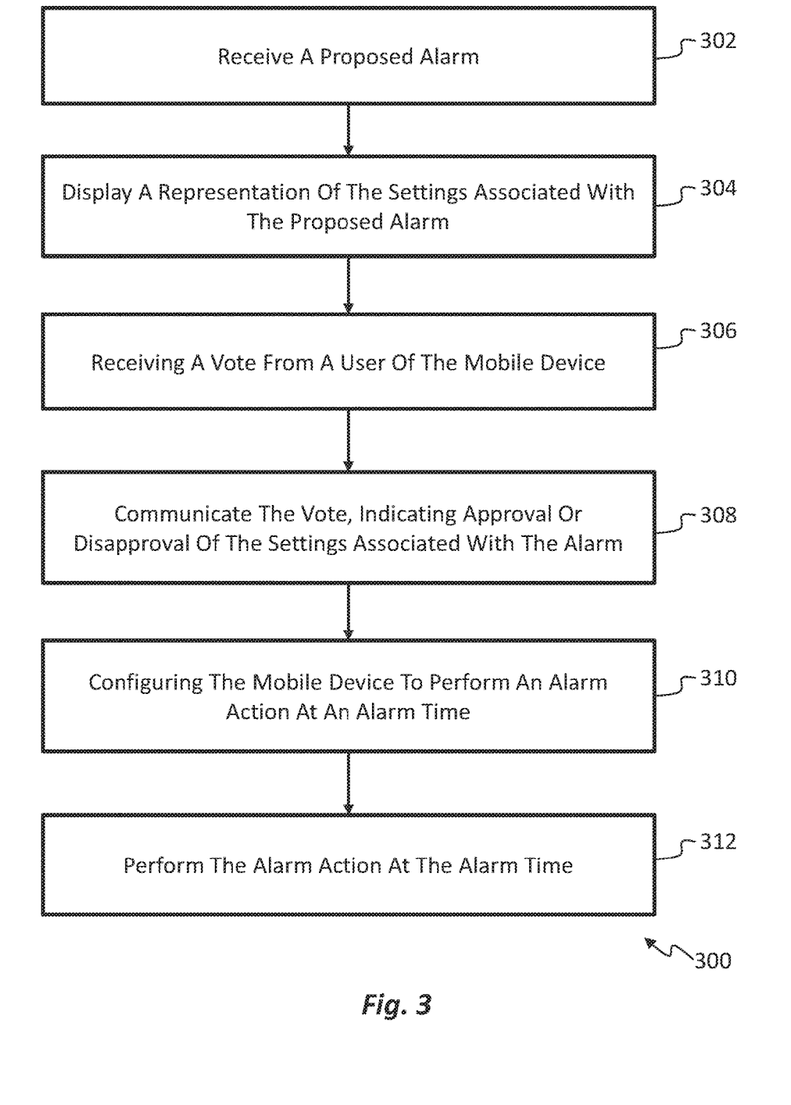
FIG. 3 illustrates another example group alarm method.

FIG. 3 illustrates another example group alarm method 300. The method 300 may configure alarm settings of a mobile device, such as one of the mobile devices 102 of FIG. 1. The method 300 may be performed, for example, by one the mobile devices 102 of FIG. 1. Although illustrated as discrete blocks, various blocks may be divided into additional blocks, combined into fewer blocks, or eliminated, depending on the desired implementation.

The method 300 may begin at block 302 by receiving a proposed alarm. The proposed alarm may be received from a mobile device of the group of mobile devices. Alternately, the proposed alarm may be received from a user of a mobile device, or the like. The proposed alarm may be associated with settings, including a proposed time. Alternately or additionally, the settings of the proposed alarm may be associated with one or more mobile device settings. The mobile device setting may alter an ordinary state of the mobile device. In some embodiments, the ordinary state of the mobile device may be altered such that the user of the mobile device is prevented from operating the mobile device in a manner that would otherwise be available to the user. For example, the mobile device settings may include an override of a setting and/or or a disabling of an option otherwise available to a user of the mobile device.

In some embodiments, the mobile device settings may include a silent state override configured to enable the mobile device to generate an audible alert when the mobile device has been placed in a silent state. The silent state override may be further configured to enable the mobile device to selectively generate the audible alert in response to being contacted by another mobile device of the group of mobile devices. Thus, for example, the silent state may be overridden for only the other users of the group while still applying to any contact attempts by devices not associated with the group. Alternately or additionally, the silent state override may be configured to override the silent state of the mobile device for a period of time following the proposed time. Thus, for example, the silent state may be overridden for a period of time relevant to the reason the group alarm was set, such that the user may be roused or otherwise reached if absent or tardy for some event, but may not be bothered by the silent state override after the event has taken place.

In some embodiments, the mobile device settings may include a snooze disabler. The mobile device may be configured to hide, disable, or otherwise ignore activation of a snooze request that may otherwise be available to the user of the mobile device. Thus, for example, the user of the mobile device may be discouraged from delaying an alarm action of the proposed alarm.

The method 300 may continue to block 304 by displaying a representation of the settings associated with the performed alarm. For example, the settings may be displayed on a display of a mobile device, such as one or more of the displays 111 of FIG. 1.

The method 300 may continue to block 306 by receiving a vote from a user of the mobile device. The vote may be associated with an approval or a disapproval of the settings associated with the proposed alarm.

The method 300 may continue to block 308 by communicating the vote. For example, the vote may be communicated to one or more other mobile terminals and/or a server, such as the mobile terminals 102 and/or the server 108 of FIG. 1. The communicated vote may indicate an approval or disapproval of the settings associated with the alarm. Thus, for example, communicating the vote may indicate to other users whether the user approves of or disapproves of the proposed alarm.

The method 300 may continue to block 310 by configuring the mobile device to perform an alarm action at an alarm time. The mobile device may be configured in response to receiving an indication that a threshold portion of the group of mobile devices has approved the proposed alarm. The approval votes may indicate approval of configuring each of the mobile devices of the group of mobile devices to perform an alarm action. In some embodiments, the threshold portion of the group of mobile devices may be associated with a majority of the group of mobile devices.

Alternately, the threshold portion may be based on a threshold portion of the votes received, which may be fewer than the number of mobile devices in the group. Alternately, some other threshold portion may be used, such as a two-thirds supermajority or some other supermajority. Alternately, the threshold portion may be less than a majority. For example, if the proposed alarm is one of multiple options, the threshold portion may be a plurality of the votes cast. In some embodiments, the mobile device may receive each of the votes and may tally the votes to determine whether enough approval votes have been received to meet a threshold portion. Alternately or additionally, another device, such as another mobile device and/or a server, may receive and tally the votes and may send an indication to the mobile device indicating that the threshold number of approval votes has been met.

The method 300 may continue to block 312 by performing the alarm action at the alarm time. The alarm time may be equal to the proposed time. The settings associated with the proposed alarm may include a flexibility setting associated with a range of times including the proposed time within which a user may adjust the alarm time. Thus, for example, the alarm time may be different from the proposed time.

The embodiments described herein may include the use of a special purpose or general-purpose computer, such as the mobile devices 102 and/or the server 108 of FIG. 1, including various computer hardware or software modules, as discussed in greater detail below.

Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media.

Computer-executable instructions comprise, for example, instructions and data which cause a general purpose computer, special purpose computer, or special purpose processing device to perform a certain function or group of functions, such as the operations, processes, and/or methods of configured group alarms described herein, including the method 200 of FIG. 2 and/or the method 300 of FIG. 3.

The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method of configuring alarm settings of a group of mobile devices, the method comprising:

receiving a proposed alarm from a mobile device of the group of mobile devices, the proposed alarm associated with settings, including a proposed time associated with a future time at which an alarm action is proposed to occur, and including a mobile device setting associated with the alarm action;

transmitting the proposed alarm to each mobile device of the group of mobile devices;

receiving a plurality of votes from the group of mobile devices, each vote of the plurality of votes being an approval vote or a disapproval vote, the approval vote associated with an approval of the settings associated with the proposed alarm, the disapproval vote associated with a disapproval of the settings associated with the proposed alarm, each of the approval votes being associated with a user, of a different mobile device of the group of mobile devices, affirmatively voting for the proposed alarm;

receiving approval votes from a majority of the mobile devices of the group of mobile devices, the approval votes from the majority of mobile devices of the group of mobile devices indicating approval of configuring each of the mobile devices of the group of mobile devices to perform the alarm action at an alarm time associated with the proposed time; and transmitting an approval indication configured to instruct each of the mobile devices to perform the alarm action at the alarm time.

2. The method of claim 1, wherein the mobile device setting includes an override of a setting or a disabling of an option otherwise available to a user of the mobile device.

3. The method of claim 1, wherein the mobile device setting associated with the alarm action includes a silent state override configured to enable the mobile device to generate an audible alert when the mobile device has been placed in a silent state.

4. The method of claim 3, wherein the silent state override enables the mobile device to selectively generate the audible alert in response to being contacted by another mobile device of the group of mobile devices.

5. The method of claim 3, wherein the silent state override is configured to override the silent state of the mobile device for a period of time following the proposed time.

6. The method of claim 1, wherein the mobile device setting associated with the alarm action includes a snooze disabler.

7. The method of claim 1, wherein the alarm time is equal to the proposed time.

8. The method of claim 1, wherein the settings associated with the proposed alarm include a flexibility setting associated with a range of times including the proposed time, within which a user of the mobile device may adjust the alarm time.

9. The method of claim 1, further comprising following performing of the alarm action, receiving a second proposed alarm associated with second settings including a second time.

10. A system comprising:

an alarm device configured to perform an alarm action;

a display;

a processor; and a non-transitory computer storage medium having computer instructions stored thereon that are executable by the processor to perform operations comprising:

receiving a proposed alarm associated with settings, including a proposed alarm time associated with a future time at which the alarm action is proposed to occur, and including a mobile device setting associated with the alarm action;

displaying, at the display, a representation of the settings associated with the proposed alarm;

receiving an approval vote or a disapproval vote from a user of the system, the approval vote associated with an approval of the settings associated with the proposed alarm, the disapproval vote associated with a disapproval of the settings associated with the proposed alarm, the approval vote being associated with the user affirmatively voting for the proposed alarm;

communicating the approval vote or the disapproval vote;

in response to a majority of a plurality of systems communicating an approval vote, receiving an approval indication configured to instruct the system to perform the alarm action at an alarm time associated with the proposed time;

in response to receiving the approval indication, configuring the alarm device, based at least in part on the settings of the proposed alarm, to perform the alarm action at the alarm time; and performing the alarm action at the alarm time.

11. The system of claim 10, wherein communicating the vote includes transmitting an approval or disapproval message to a server.

12. The system of claim 10, wherein communicating the vote includes transmitting an approval message or a disapproval message to each system of the plurality of systems.

13. The system of claim 10, wherein the proposed alarm is further associated with settings including a silent mode disabler such that configuring the alarm device includes overriding a silent mode of the alarm device such that the alarm device produces an audible alert.

14. The system of claim 13, wherein the system is configured to override the silent mode of the alarm device and produce the audible alert in response to receiving a communication from a second system of the plurality of systems for a length of time following the alarm time.

15. The system of claim 10, wherein the proposed alarm is further associated with settings including a snooze disabler such that, in response to the majority of the plurality of systems indicating approval of the proposed alarm, the system is configured to disable an ability of a user of the system to temporarily delay the alarm action.

16. A mobile device associated with a group of mobile devices, the mobile device comprising:

a display;

a processor; and a non-transitory computer storage medium having computer instructions stored thereon that are executable by the processor to perform operations comprising:

receiving a proposed alarm associated with settings, including a proposed alarm time associated with a future time at which an alarm action is proposed to occur, and including a mobile device setting associated with the alarm action;

displaying, on the display, a representation of the settings associated with the proposed alarm;

receiving, at the mobile device, an approval vote or a disapproval vote from a user of the mobile device, the approval vote associated with an approval of the settings associated with the proposed alarm, the disapproval vote associated with a disapproval of the settings associated with the proposed alarm, the approval vote being associated with the user affirmatively voting for the proposed alarm;

communicating the approval vote or the disapproval vote;

in response to a majority of mobile devices of the group of mobile devices communicating an approval vote, receiving an approval indication configured to instruct the mobile device to perform the alarm action at an alarm time associated with the proposed time;

in response to receiving the approval indication, configuring the mobile device, based at least in part on the settings of the proposed alarm, to perform the alarm action at the alarm time; and performing the alarm action at the alarm time.

17. The mobile device of claim 16, wherein the proposed alarm is further associated with settings including a silent mode disabler such that configuring the mobile device to perform the alarm action includes overriding a silent mode of the mobile device such that the alarm action produces an audible alert.

* * * * *